United States Patent [19]

Watts et al.

[11] 3,803,761
[45] Apr. 16, 1974

[54] MANUFACTURE OF DORMANT PELLET SEED

[75] Inventors: Harry Watts, Sarnia, Ontario; Kurt Schreiber, Winnipeg, Manitoba, both of Canada

[73] Assignee: The Dow Chemical Company, Midland, Mich.

[22] Filed: Oct. 5, 1972

[21] Appl. No.: 295,372

[52] U.S. Cl. .............................................. 47/57.6
[51] Int. Cl. ............................................. A01c 1/06
[58] Field of Search ............ 47/57.6, DIG. 9, 1, 58; 71/77; 117/3

[56] References Cited
UNITED STATES PATENTS

| | | | |
|---|---|---|---|
| 2,651,883 | 9/1953 | Hedrick et al. | 47/57.6 |
| 3,113,399 | 12/1963 | Eversole et al. | 47/DIG. 9 |
| 3,598,565 | 8/1971 | Graves | 71/77 |
| 3,698,133 | 10/1972 | Schreiber | 47/57.6 |
| 3,621,612 | 11/1971 | Porter | 47/58 |

FOREIGN PATENTS OR APPLICATIONS 1,071,804   6/1967   Great Britain

*Primary Examiner*—Robert E. Bagwill
*Attorney, Agent, or Firm*—Albin R. Lindstrom

[57] ABSTRACT

This invention is directed to a plant seed having a coating thereon, said coating being of a non-elastomeric material, such as a polymer, said material in film form permitting oxygen transmission sufficient for normal respiration of the seed and having a controlled permeability to water and an elongation to breaking less than about 200 percent and said coating being of a thickness that it will control the water imbibition of the seed to the extent necessary to delay germination until environmental conditions are satisfactory to continued crop growth.

1 Claim, No Drawings

MANUFACTURE OF DORMANT PELLET SEED

BACKGROUND OF THE INVENTION

In the prairie provinces of Canada as well as in other climatically similar regions located in other countries, the cultivation of higher yielding winter crops is impractical due to the severe winter conditions. Spring seeding is, in spite of temperatures conducive for the germination of seeds, usually delayed by three to four weeks due to adverse weather conditions, such as morning frost, high winds and excess of moisture. With the relatively short growing periods available, this delay in seeding frequently prevents timely maturing of the crop and, as a rule, reflects adversely in yields and qualities of various crops.

Other areas of the world have different but equally vexatious climatic problems to the attainment of a maximum growing season. For example some areas have a short rainy season in the spring which is sufficient with the natural seed to induce germination but insufficient to bring the crop to maturity. That season is followed by an arid period during which the young seedlings will have a high mortality. Subsequently the optimum conditions arrive but too late to save much of the crop. If planting is delayed until the optimum conditions, obviously a significant part of the growing season is used up in the induction of germination. If planted too early the germinated seeds will perish.

Still other areas have different climatic cycles that make attainment of the maximum period of optimum growing time virtually impossible in a practical sense.

DESCRIPTION OF THE PRIOR ART

In U.S. Pat. No. 3,545,129 (Canadian 836,461) there is described a system for coating seeds to prevent premature germination. That system utilizes three separate coatings of different composition to achieve that end. The coatings involved were a porous inner coat, an intermediate coat to separate the inner and outer coats, and an outer coat to provide environmental protection. Such a system requires the inventory of three separate coating compositions, three coating steps, a relatively thick coating that increases coating weight and storage space.

SUMMARY OF THE INVENTION

The benefits and advantages of the present invention are achieved with a seed having a coating thereon, the coating comprising a material having (a) a permeability to water such that a seed coating made therefrom will control the water imbibition of the seed to the extent necessary to delay germination until environmental conditions are satisfactory to continued crop growth (b) a permeability to oxygen such that sufficient oxygen will be transmitted to permit normal respiration, and (c) physical properties, such as elongation, of such a character that the coating will rupture when the seed has passed the period of needed protection and has entered the period when germination and growth are desired.

The invention also comprehends the seed coating process comprising the deposition of a thin enveloping coating of a suitable material onto the seed.

Basically the concept of the present invention is such that the coating will (1) maintain its integrity during periods of climatic conditions that might or might not induce germination with uncoated seeds but in either event would be unfavorable for continued crop growth and will (2) rupture under such climatic conditions favorable to both germination and continued crop growth. Thus the inventive concept permits the tailoring of seed coatings for achieving optimum germination and growth while allowing early planting within a wide time period. Other advantages also accrue from the concept. For example, birds will not eat the coated seeds. In addition additives such as fungicides can be formulated into the coating composition to improve the storage life of the seeds. Other additives such as inert fillers may also be used for any particular function that might be desired. The automatic synchronization of the germination of the seed and growth of the plant to the optimum climatic conditions is the principal benefit. The concept is of equal utility in prairie provinces of Canada and the northern plain states of the United States where survival over a cold season is the problem and in those areas of the world, such as the Middle East, where survival over a hot arid season is desired, as well as in other parts of the world wherever environmental problems exist.

The coating provides the prime resistance to undesirable environmental conditions which would permit an untreated seed to germinate but would restrict and hinder its continued growth and development and possibly kill the seedling. At the same time the coating must be inherently fissionable under agronomically suitable environmental conditions such that germination and growth will not be unduly delayed. To achieve that goal the coating must be continuous, preferably homogeneous, and be of a composition having the desired characteristics when applied in a practical thickness.

To function in the manner of this invention the coating should exhibit a water vapor transmission rate (hereinafter referred to as WVTR) between about 0.03 and 5 grams water/100 inch.$^2$ of 1 mil film/24 hours as measured by ASTM E96-66. Coatings which exhibit water vapor transmission values outside of those stated limits will not be generally capable of functioning to satisfy the desired agronomical objectives.

The coating must also have an oxygen permeability such that sufficient oxygen will be transmitted to permit normal respiration of the seed. It is difficult to assign a precise value to the requisite permeability because it will vary somewhat from seed to seed. Also for some seeds that value may not have been determined requiring routine experimentation. However, the benefits of the invention will generally be obtained when the oxygen transmission is at least 0.05 cc oxygen/100 square inches of 1 mil film/24 hours. Oxygen transmission values for many polymeric coatings are published in the literature or, if not, may be determined by simple preliminary experiment.

Another coating parameter involved in meeting the objectives of the invention is the elongation to breaking of the coating. For the herein stated purposes that elongation to breaking should be less than about 200 percent as measured by ASTM D 882-67. When materials, such as elastomers, having greater elongation than the stated value are used, the coating merely continues to swell under the stress of water imbibition but does not fracture. In such instances the seed suffers loss of viability through exhaustion of its energy systems.

The necessary property of water vapor permeability is influenced not only by the coating formulation but also by the coating thickness. Coating thickness will also determine the stress necesary to cause elongation and subsequent rupture of the coating. A coating material having a high WVTR may be applied in greater thickness than one having a low WVTR to achieve a coating of about the same permeability. As a general rule the composition capable of achieving the stated objectives in the thinnest section will be preferred. The most practical thickness range for the coating will be from about 0.01 to 0.15 millimeter.

The coating must be of a film forming composition which is capable of deposition onto the seed in the desired thickness. Many materials are satisfactory as the film forming component of the outer coating.

An advantageous genus of materials useful for forming the coating is the class of polymer including those of natural origin, such as shellac and beeswax; modifications of natural polymers, such as the cellulose ethers and esters which are water insoluble or difficultly soluble; and the synthetic man-made polymers prepared by the polymerization of monomeric entities. The latter group of synthetic polymers is readily available, permits easy tailoring of properties for a given situation, and is useful with a variety of conventional application techniques utilizing existing coating equipment. For these reasons and others, this group of synthetic polymers are a preferred subgenus of materials for use as the film forming component of the coating.

Typical of those preferred polymers are the polymers and inter polymers of ethylenically unsaturated monomers such as vinyl chloride, vinylidene chloride, vinyl alkanoates, such as vinyl acetate, and the alkyl acrylates and methacrylates. To achieve the most useful properties of the coating as well as facile film formability it is usually desirable to interpolymerize two or more of the monomers. That is readily accomplished by known polymerization methods.

Also representative of the preferred subgenus are the polymers prepared by condensation polymerization of monomers to form polyesters, polyamides and other known species resulting from this technique.

The above delineation of synthetic polymers is intended only to be exemplary of those useful herein. Standard reference works in the literature of polymers will suggest other monomer combinations meeting the criteria for functioning in the present invention. Polymer systems having marginal film formability may have that characteristic upgraded by incorporation of small amounts of known plasticizers. Likewise, some polymer systems require stabilization to inhibit degradation of their properties and the inclusion of light, heat, oxidation and other stabilizers is within the comprehension of this concept. Further, it may be desirable to color code seeds of different species, of different distributors or for other reason so that inclusion of conventional colorants is comprehended. Any additive incorporated in the coating composition should be able to perform its intended function without detracting unduly from the coating properties or affecting the seed.

Depending upon the coating apparatus and technique employed, the film forming component may be deposited from a variety of coating media. Aqueous latexes are a particularly useful and versatile form of preparing the desired formulation and for depositing the coating and accordingly are preferred.

Although the concept of this invention depends essentially on a coating it should be understood that it is within the comprehension hereof that the coating may be built up in layers of the same or different materials to the desired thicknesses by the repetitive deposition and drying of a number of very thin coatings. Because of economics or for other reason the use of such a coating technique may be the most simple means to achieve the optimum coating system for a given situation. When different coating materials are employed each should meet the aforedescribed parameters. One situation where the use of different coatings may be used is with wheat seeds which have a "brush" that is difficult to coat with a polymer latex. That brush may be removed by singeing or by scarification. However, an equally efficious technique is to apply a thin coating of paraffin which can then be followed by a polymer coating to provide abrasion resistance and other physical properties.

An apparatus suitable for use in coating the seeds is one which is known as a Wurster air suspension apparatus and is embraced by U.S. Pat. No. 2,648,609 issued Aug. 11, 1953 to Dale E. Wurster and U.S. Pat. No. 2,799,241 issued July 16, 1957 to Dale E. Wurster.

The concept of this invention is illustrated in the following examples wherein all parts and percentages are by weight unless otherwise indicated.

The seed coating procedure used in the following examples is an adaption of that claimed in U.S. Pat. No. 2,648,609 wherein an air stream is moved in a confined space upwardly past the seeds with a force sufficient to suspend them continuously therein, and introducing the coating fluid in the form of an atomized mist into the air stream prior to its contact with the seeds. It is also to be observed that in this modification, the air stream is heated to dry quickly the coating applied to the seeds.

The operation of the procedure using the apparatus heretofore described may be briefly summarized in the following terms. Heated air is forced through the apparatus by means of a blower to maintain a bed temperature of from about 80° to 120°F. The coating is atomized through a spraying nozzle and is deposited on the seed to be coated in thin layers which are quickly dried under the influence of the heated drying air. The rapid drying provides a cooling effect which prevents overheating of the seed. Application of a plurality of thin, consecutive layers of coating materials soon add up to the total coating required. The degree of dryness of the finished coat can be controlled within the apparatus during the coating operation.

The temperature of the seed during the coating operation should be in the range of about 80° to 120°F. Thus the inlet temperature of the drying medium, which will usually be air, may be somewhat higher. If the seed temperature rises significantly above 120°F there is a risk that the seed will be killed. Also such temperature may be above the softening temperature of the coating material so that the coated seeds will stick together. If the temperature is significantly below about 80°F the coating may not be drying fast enough and the coated seeds will stick together. The optimum temperature to be employed may be determined by simple preliminary experiment taking into account the particular seed to be coated and the coating material used.

The general technique for the production of the seed of an aspect of the present invention may be described as follows:

Approximately 500 grams of seed which may, for example, be spring wheat, was used in one run. The coating process is commenced with a slow pumping rate, which is thereafter controlled to prevent agglomeration of the seed. The time involved for the whole procedure is approximately one hour.

Another coating procedure using a rotary drum wherein the seed is tumbled while the coating composition is sprayed thereon while a stream of hot air is directed at the coated seeds. The inlet air temperature and coating composition feed rate are controlled so that the temperature of the bed of seeds is maintained between about 80° to 120°F as determined by a thermocouple probe in the bed. The optimum temperature will depend on the seed being coated and the particular coating composition being applied.

EXAMPLE 1

Rapeseed was coated with the air suspension method using 650 grams of seed and 125 cubic centimeters of an aqueous latex of a polymer composed of 75 weight percent vinylidene chloride, 20 weight percent vinyl chloride and 5 weight percent ethyl acrylate at about 50 percent solids.

The coated seed was planted in Winnipeg, Canada on September 18. The following spring 90 percent of the seeds had germinated.

Uncoated seeds planted at the same time as a control germinated in the fall and were totally killed by freezing.

The yield of the fall planted coated seeds was 19 percent higher than that realized with uncoated seeds planted in the spring at the same rate.

EXAMPLE 2

Rapeseed was coated with the rotary drum method using 454 grams of seed and 73.8 milliliters of an aqueous latex of a polymer of 70 weight percent vinylidene chloride, 25.5 weight percent vinyl chloride and 4.5 weight percent ethyl acrylate at about 50 percent solids.

The seeds were planted in Sarnia, Canada in November. The following spring 55 percent of the seeds had germinated.

Uncoated seeds planted as a control showed only 17 percent germination.

EXAMPLE 3

Wheat seeds were singed to remove the brush. The seeds were then coated by the rotary drum method with the latex described in Example 2 at a rate of 3 liters per sixty pound bushel.

The seeds were planted in Winnipeg, Canada on October 1. The following spring 35 percent had germinated. In contrast uncoated seeds planted at the same time germinated in the fall and were killed by frost.

EXAMPLE 4

Sunflower seeds were coated according to the procedure of Example 3.

The seeds were planted in Winnipeg, Canada on September 29. The following spring 25 percent had germinated. By way of contrast uncoated seeds planted at the same time showed no germination in the spring.

EXAMPLE 5

3000 grams of soybean seeds were coated by the rotary drum method with 60 grams methyl cellulose and 30 cubic centimeters of glycerine in water and dried. Then 1030 grams of the coated seeds were coated with 50 cubic centimeters of a latex of Example 2 and dried.

The seeds were planted in Winnipeg, Canada in September. The following spring 70 percent had germinated.

Uncoated seeds showed no germination.

EXAMPLE 6

1200 grams of wheat seed were coated by the rotary drum method with a blend of 100 grams paraffin, 50 grams soya protein and 2.5 grams ammonium stearate. 510 grams of the coated seeds were then coated with 50 cubic centimeters of a latex of a polymer of 75 weight percent vinyl chloride and 25 weight percent vinylidene chloride with 6 cubic centimeters diethyl phthalate as plasticizer.

The seeds were planted in Winnipeg, Canada in September. The following spring 40 percent had germinated.

Uncoated seeds showed no germination.

It should be apparent that the particular compositions to be employed will depend upon the seed to be coated, the area where the seed is to be planted and the climatic problem to be overcome. Judicious determination of the optimum composition for the given situation may be made within the aforementioned guidelines by simple accelerated laboratory screening tests.

In similar manner seeds of barley and oat, have been planted in Canada, with the desired delay in germination until the most favorable conditions appear.

In addition to the previously mentioned benefits it has been observed that the instant concept provided plants with better root development and better drought resistance, and in the case of wheat more tillers with fully developed spikes, shorter but stronger straw, superior yield, and improved quality (more protein).

What is claimed is:

1. A seed having a single, continuous, adherent coating thereon of a composition of an interpolymer composed of from about 25 to 75 weight percent vinylidene chloride, from about 20 to 75 weight percent vinyl chloride and from about 0 to about 5 weight percent lower alkyl acrylate, wherein said coating has physical and chemical properties and is of a thickness of from about 0.01 to about 0.15 millimeter and has a water vapour transmission rate of between about 0.03 and 5 grams water/100 in.$^2$ of 1 mil film/24 hours and an elongation to break of less than about 200 percent which permits sufficient oxygen transmission for normal respiration of the seed and controls water imbibition of the seed to the extent necessary to delay germination until environmental conditions are satisfactory to continued crop growth.

* * * * *